United States Patent
Honda et al.

(10) Patent No.: US 8,208,217 B2
(45) Date of Patent: Jun. 26, 2012

(54) MAGNETIC RECORDING MEDIUM AND MAGNETIC RECORDING/REPRODUCING SYSTEM

(75) Inventors: Hidetoshi Honda, Miyagi (JP); Seiichi Onodera, Miyagi (JP); Naoki Ikeda, Miyagi (JP); Takanori Sato, Miyagi (JP); Kazunari Motohashi, Miyagi (JP); Daizo Shiga, Miyagi (JP)

(73) Assignee: Sony Corporation, Tokyo (JP)

( * ) Notice: Subject to any disclaimer, the term of this patent is extended or adjusted under 35 U.S.C. 154(b) by 652 days.

(21) Appl. No.: 12/241,536

(22) Filed: Sep. 30, 2008

(65) Prior Publication Data

US 2009/0091856 A1  Apr. 9, 2009

(30) Foreign Application Priority Data

Oct. 5, 2007  (JP) ................ P2007-262169

(51) Int. Cl.
*G11B 5/008* (2006.01)
(52) U.S. Cl. .......................................... 360/90
(58) Field of Classification Search .......... 360/90, 360/131, 134; 428/212, 836.1; 427/128
See application file for complete search history.

(56) References Cited

U.S. PATENT DOCUMENTS

| | | | | |
|---|---|---|---|---|
| 4,855,175 A | * | 8/1989 | Wakai et al. | 428/148 |
| 5,378,548 A | * | 1/1995 | Torii et al. | 428/832.1 |
| 5,492,774 A | * | 2/1996 | Tateno et al. | 428/836.2 |
| 5,496,620 A | * | 3/1996 | Kitakami et al. | 428/212 |
| 5,744,234 A | * | 4/1998 | Kitaori et al. | 428/332 |
| 6,251,496 B1 | * | 6/2001 | Maezawa | 428/141 |
| 6,251,532 B1 | * | 6/2001 | Futamoto et al. | 428/828 |
| 6,544,672 B1 | * | 4/2003 | Futamoto et al. | 428/832 |

FOREIGN PATENT DOCUMENTS

| | | |
|---|---|---|
| JP | 04-353622 | 12/1992 |
| JP | 09-073621 | 3/1997 |
| JP | 2000-339605 | 12/2000 |
| JP | 2002-373410 | 12/2002 |
| JP | 3393491 | 1/2003 |
| JP | 3441754 | 6/2003 |
| JP | 2004-326888 | 11/2004 |
| JP | 2006-048840 | 2/2006 |

OTHER PUBLICATIONS

Japanese Office Action issued on Jun. 10, 2009 in connection with JP Application No. 2007-262169.

* cited by examiner

*Primary Examiner* — Angel A. Castro
(74) *Attorney, Agent, or Firm* — SNR Denton US LLP (57) ABSTRACT

A magnetic recording medium includes a tape-shaped nonmagnetic support, and a vertical magnetic layer formed on a main surface of the nonmagnetic support by a vacuum thin-film forming technique, signals being recorded on and reproduced from the vertical magnetic layer in a linear system. In the magnetic recording medium, the dipulse ratio of the vertical recording layer is 0.36 or more.

6 Claims, 6 Drawing Sheets

MAGNETIC RECORDING MEDIUM AND MAGNETIC RECORDING/REPRODUCING SYSTEM

CROSS REFERENCES TO RELATED APPLICATIONS

The present invention contains subject matter related to Japanese Patent Application JP 2007-262169 filed in the Japanese Patent Office on Oct. 5, 2007, the entire contents of which are incorporated herein by reference.

BACKGROUND OF THE INVENTION

1. Field of the Invention

The present invention relates to a high-density magnetic recording medium and particularly to a magnetic recording medium used for a so-called linear magnetic recording/reproducing system in which signals are recorded and reproduced using a magnetoresistive magnetic head (MR head) or a giant magnetoresistive magnetic head (GMR head) while the magnetic head is moved in both directions along the longitudinal direction of a magnetic tape. The present invention also relates to a magnetic recording/reproducing system using the magnetic recording medium.

2. Description of the Related Art

In the field of video tape recorders and the like, so-called metal thin film-type magnetic recording media have recently been applied for achieving higher image quality and a higher recording density, the magnetic recording media having a configuration in which a magnetic layer is formed directly on a nonmagnetic support by a vacuum thin-film forming technique using a magnetic metal material or any one of various magnetic materials such as, a Co—Ni alloy, a Co—Cr alloy, a Co—CoO metal oxide, and the like.

Further, in order to improve the electromagnetic conversion characteristics of the above-described magnetic recording media and achieve higher output, so-called oblique deposition has been proposed for forming magnetic layers of the magnetic recording media. Magnetic recording media including magnetic layers formed by this method have been put into practical use as deposited tapes for high-band 8 mm video tape recorders and digital video tape recorders.

The above-described metal thin film-type magnetic recording media are excellent in coercive force and remanence ratio and permit the formation of very thin magnetic layers, and thus have excellent electromagnetic conversion characteristics in a short wavelength region and small recording demagnetization and thickness loss in reproduction. Unlike in so-called coat-type magnetic recording media including magnetic layers which are formed by applying to a nonmagnetic support a magnetic coating material containing magnetic powder dispersed in a binder, a binder as a nonmagnetic material is not mixed in the magnetic layers, and the packing density of a ferromagnetic metal material is increased, causing advantage in increasing the recording density.

In addition, magnetic tapes produced by oblique deposition are produced by a method of depositing a magnetic material on a main surface of, for example, a long nonmagnetic support under a condition in which the nonmagnetic support is run in the longitudinal direction thereof. In this case, high productivity and excellent magnetic characteristics may be secured.

On the other hand, the recording densities of magnetic recording media increase with the increasing demand for magnetic recording media, such as magnetic tapes, as data streamers. Further, magnetoresistive magnetic heads (MR heads) or giant magnetoresistive magnetic heads (GMR heads) are applied as magnetic heads for reproducing recorded information in stead of related art inductive heads. The MR heads and GMR heads are capable of detecting with high sensitivity small magnetic leakage flux from magnetic layers and are advantageous in improving the recording density.

The MR heads and GMR heads have a detection limit at which sensitivity to a magnetic leakage flux is saturated, and thus greater magnetic leakage flux than the design limitations of the MR heads and GMR heads may not be detected. Therefore, the sensitivity to magnetic leakage flux may be optimized by decreasing the thickness of a magnetic layer of a magnetic recording medium.

As a recording/reproducing system for a magnetic tape used as a data streamer, the two systems, i.e., a helical san system and a linear system, are put into practical use. The helical scan system is one in which a magnetic head disposed on a rotating drum scans on a magnetic tape while rotating at a high speed to record and reproduce signals.

The helical scan system is basically capable of control to permit precise recording on a recording track and precise scan on the recorded track during reproduction. Therefore, a high recording density may be achieved in a magnetic tape system. Such a helical scan system is put into wide practical use as a home video picture recorder such as VHS, a high-band 8 mm video tape recorder, and a digital video tape recorder.

On the other hand, the linear system is one in which tracks are provided on a magnetic tape in the width direction thereof so that recording and reproduction are preformed in the longitudinal direction. This system is capable of easily running a tape at a high speed and improving a transfer rate of recording and reproduction by arranging many magnetic heads in parallel.

The helical scan system capable of achieving a high recording density is advantageous for magnetic recording tape systems used for camcorders. However, the linear system is widely used for data storage application in which the volume of a magnetic recording tape system is not greatly limited. In the market, mainstream commercial products are DLT (digital linear tape) and LTD (linear tape-open).

As a magnetic tape medium for such linear system data storage application, only a so-called coat-type magnetic tape is used, and a magnetic tape medium produced by oblique deposition has been not used. This is because in the helical scan system, a magnetic tape and a magnetic head are relatively moved in a constant direction, while in the linear system, a magnetic tape and a magnetic head are relatively moved in both directions along the longitudinal direction of the tape.

Figure 1:
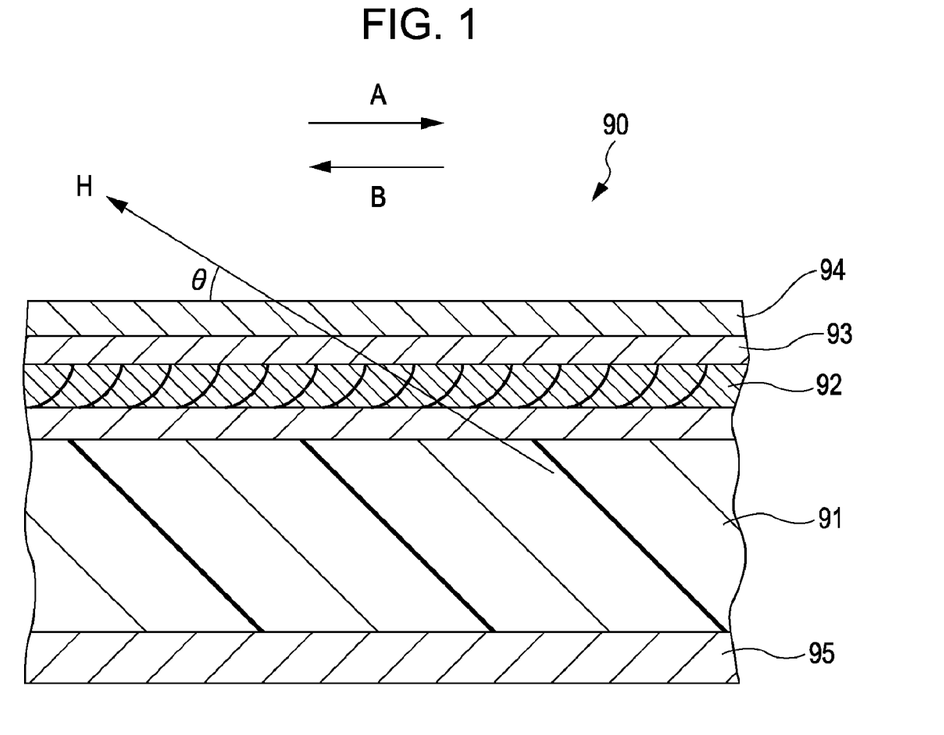
FIG. 1 is a sectional view showing a configuration of a magnetic recording medium provided with a magnetic layer including an obliquely deposited film.

FIG. 1 is a schematic sectional view of a magnetic tape medium produced by oblique deposition. As shown in FIG. 1, a magnetic layer 92 is formed on a nonmagnetic support 91. A magnetic tape medium produced by oblique deposition has a structure in which the easy magnetization axis along which recorded magnetic bits are oriented rises from a tape plane, not extend in a planar direction of the tape (lateral direction in the drawing).

When a head slides in the forward direction (direction of arrow A) on the columnar structure of an obliquely deposited film in recording and reproduction, good recording/reproduction characteristics are exhibited. However, when a head slides in the backward direction (direction of arrow B) on the columnar structure of an obliquely deposited film, characteristics such as the optimum record current, phase characteristics, CN ratio, and output characteristics are inferior to those in sliding in the forward direction, and good recording/reproduction characteristics are not exhibited.

Figure 2:
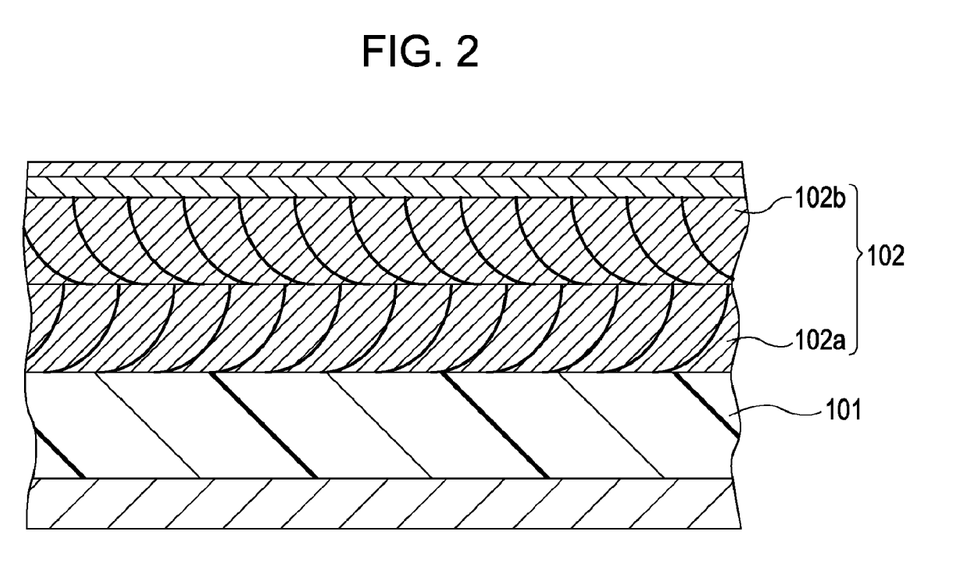
FIG. 2 is a sectional view showing a configuration of a magnetic recording medium provided with a magnetic layer including a laminate of obliquely deposited films.

Therefore, a magnetic tape medium produced by oblique deposition has rarely been used for the linear system in which recording and reproduction are performed in both directions. As a method for resolving the problem in which the recording/reproduction characteristics in sliding in the forward direction on the columnar structure of the obliquely deposited film are different from those in sliding in the backward direction, there has been proposed a method of forming two layers of obliquely deposited films with different growth directions to form a magnetic layer of an obliquely deposited tape (refer to Japanese Unexamined Patent Application Publication No. 4-53622). FIG. 2 is a schematic sectional view of a magnetic tape medium described in Japanese Unexamined Patent Application Publication No. 4-353622.

As shown in FIG. 2, a magnetic layer 102 is formed on a nonmagnetic support 101, the magnetic layer 102 having a structure in which a lower ferromagnetic metal thin film 102a and an upper ferromagnetic metal thin film 102b are laminated. The oblique columnar structures of the lower-layer ferromagnetic metal thin film 102a and the upper-layer ferromagnetic metal thin film 102b are grown in opposite directions in the longitudinal direction of the nonmagnetic support 101. The thicknesses of the lower-layer ferromagnetic metal thin film 102a and the upper-layer ferromagnetic metal thin film 102b are optimized to decrease a difference in recording/reproduction characteristics in both directions.

Japanese Unexamined Patent Application Publication No. 9-73621 discloses a magnetic recording medium including a laminate of two layers of obliquely deposited films having obliquely columnar structures grown in different directions. In the magnetic recording medium disclosed in Japanese Unexamined Patent Application Publication No. 9-73621, the ratio of maximum coercive force/minimum coercive force obtained by changing the applied magnetic field angle from 0° to 180° is 0.65 or more in order to improve the recording/reproduction characteristics in both directions.

Japanese Unexamined Patent Application Publication No. 2000-339605 discloses a magnetic recording method in which the thickness of a magnetic layer composed of a single layer of cobalt-based obliquely deposited film is controlled to be ½ or less of the gap length of a magnetic head, thereby permitting linear-system recording and reproduction. This method preferably uses a cobalt-based obliquely deposited film having a thickness of 40 nm or less and a coercive force of 1,800 Oe or more.

Japanese Unexamined Patent Application Publication No. 2004-326888 discloses that even in an obliquely deposited tape including a single magnetic layer formed by a vacuum thin-film forming technique and having an oblique columnar structure, when the ratio Hcmax/Hc0 is adjusted to 1.2 or less, wherein Hcmax is the maximum coercive force in a plane perpendicular to the magnetic layer and including the longitudinal direction of the magnetic recording medium, and Hc0 is coercive force in the longitudinal direction of the magnetic recording medium, the same characteristics may be exhibited in the forward and backward directions.

On the other hand, a coat-type medium exhibits the same characteristic values in the forward and backward directions even when produced by a usual coating method because a magnetic material is not arranged obliquely as long as a general production method is employed.

However, as described in Japanese Unexamined Patent Application Publication No. 6-251355, there has been proposed a method using, for longitudinal recording, hexagonal ferrite generally developed as a vertical medium. However, as described in paragraph [0072] in Japanese Unexamined Patent Application Publication No. 6-251355, the recording wavelength evaluated at a frequency of 7 MHz using a 8-mm video deck is estimated to be about 0.5 µm, and the composition may be unsuitable for a current digital magnetic recording system used at a shortest recording wavelength of 0.25 µm or less.

In addition, as described in Japanese Patent No. 3393491, there has been the idea that a vertical magnetic recording medium including a thin film formed by vacuum deposition is used for a ring head. However, as evaluated in comparative examples below, the vertical magnetic recording medium is unsuitable as a magnetic tape used in a linear serpentine system because of the large unbalance between the characteristics in the forward and backward directions.

SUMMARY OF THE INVENTION

However, since an obliquely deposited magnetic tape medium which is improved in recording/reproduction characteristics in both directions by the method described in Japanese Unexamined Patent Application Publication Nos. 4-353622 and 9-73621 has two magnetic layers having different growth directions, a step of forming a magnetic layer is performed twice, leading to an increase in cost of a magnetic recording medium. In order to secure a share in the recent tape storage market, it is very important to decrease the cost of a magnetic recording medium. Strictly speaking, the thickness of the upper magnetic layer is set to be slightly smaller than that of the lower magnetic layer so that the outputs in the forward and backward directions are the same at a specified recording wavelength, thereby causing variation in F characteristics. In this case, even when the outputs in the forward and backward directions are the same at a specified recording wavelength, it is difficult to exhibit the same characteristics in the forward and backward directions at all recording wavelengths used for recording and reproduction.

In Japanese Unexamined Patent Application Publication No. 4-353622, the total thickness of the magnetic layers is 160 nm to 200 nm, and in an example of Japanese Unexamined Patent Application Publication No. 9-73621, the two magnetic layers with a thickness of 90 nm are laminated so that the total thickness of the magnetic layers is 180 nm. When the thickness of the magnetic layers is in such a range, a MR head or GMR head is saturated and does not detect a magnetic leakage flux because the head has high sensitivity. In Japanese Unexamined Patent Application Publication No. 2000-339605, the thickness of the magnetic layer is specified, but the dependency of coercive force on the applied magnetic field angle and the magnetic anisotropy of the magnetic layer are not particularly described.

In addition, the magnetic recording method of Japanese Unexamined Patent Application Publication No. 2000-339605 may be used in a linear system but causes a difference between the characteristics in the forward and backward directions in actual use. Therefore, correction may be performed in a recording/reproducing system. The amount of correction varies with the tape, and thus an optimum value is determined by trial writing or various optimum parameters are recorded on a memory device or the like attached to a cartridge. Therefore, a limitation in use easily occurs.

This problem applies to Japanese Unexamined Patent Application Publication No. 2004-326888. Although a difference between the frequency characteristics in the forward and backward directions at the recording wavelength is decreased, a difference between the outputs in the forward and backward running directions is as relatively large as 3 dB.

Therefore, the limitation in use is decreased, but it may be necessary to recognize a difference between the characteristics in the forward and backward directions for each tape on the drive side during use. Thus, the obliquely deposited tape is not optimum as a magnetic tape used in a linear system.

On the other hand, a related art coat-type medium exhibits substantially the same characteristics in the forward and backward directions and currently used in a so-called linear serpentine system such as DLT or LTO. Although the usability of a medium basically considered as a vertical medium as described in Japanese Unexamined Patent Application Publication No. 6-251355 is investigated, the medium may not be an optimum tape because it is difficult to decrease the size of a magnetic material when the recording density is increased by decreasing the shortest recording wavelength to 0.15 μm or less.

In addition, the vertical recording medium described in Japanese Unexamined Patent Application Publication No. 6-251355 possibly causes no difference between the characteristics in the forward and backward directions. However, even when the vertical recording medium is used, the characteristics in use in the helical scan system are different from those in the linear serpentine system. In use in the linear serpentine system, a significant difference occurs between the characteristics in the forward and backward running directions, and thus the characteristics are substantially close to Japanese Unexamined Patent Application Publication No. 2000-339605. Therefore, the vertical recording medium does not meet the purpose of using a metal thin film tape such as a deposited tape in the linear serpentine system.

It is desirable to provide a magnetic recording medium including a metal thin film-type vertical magnetic layer which is optimum for a linear serpentine system in which recording and reproduction are performed by running in both the forward and backward directions along the longitudinal direction of the magnetic recording medium, and also provide a magnetic recording/reproducing system using the magnetic recording medium.

Figure 3:
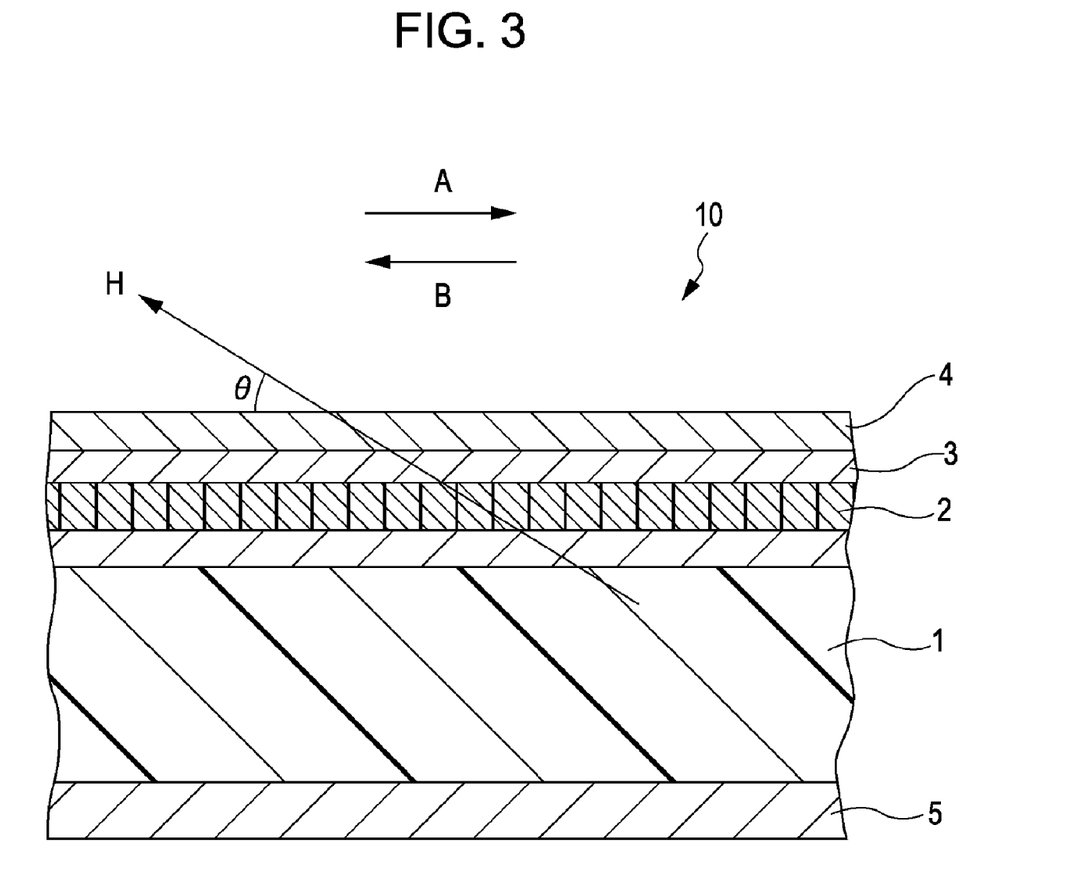
FIG. 3 is a sectional view showing a configuration of a magnetic recording medium according to an embodiment of the present invention.

A magnetic recording medium according to an embodiment of the present invention includes a tape-shaped nonmagnetic support, and a vertical magnetic layer formed on a main surface of the nonmagnetic support by a vacuum thin-film forming technique, signals being recorded on and reproduced from the vertical magnetic layer in a linear system. In the magnetic recording medium, the dipulse ratio of the vertical recording layer is 0.36 or more (FIG. 3).

The vertical magnetic layer preferably exhibits the maximum coercive force Hcmax at an applied magnetic field angle of 83 to 105 degrees with respect to the magnetic recording medium and the minimum coercive force Hcmin at an applied magnetic field angle of −30 to 30 degrees. In this case, the maximum coercive force Hcmax is preferably 93 kA/m or more.

In addition, it is preferred that the product Mr·t of remanence ratio Mr and the thickness t of the vertical magnetic layer is in the range shown by expression (1), and signals recorded on the vertical recording layer are reproduced by sliding a magnetoresistive magnetic head.

$$3(mA) \leq Mr \cdot t < 12(mA) \quad (1)$$

Figure 7:
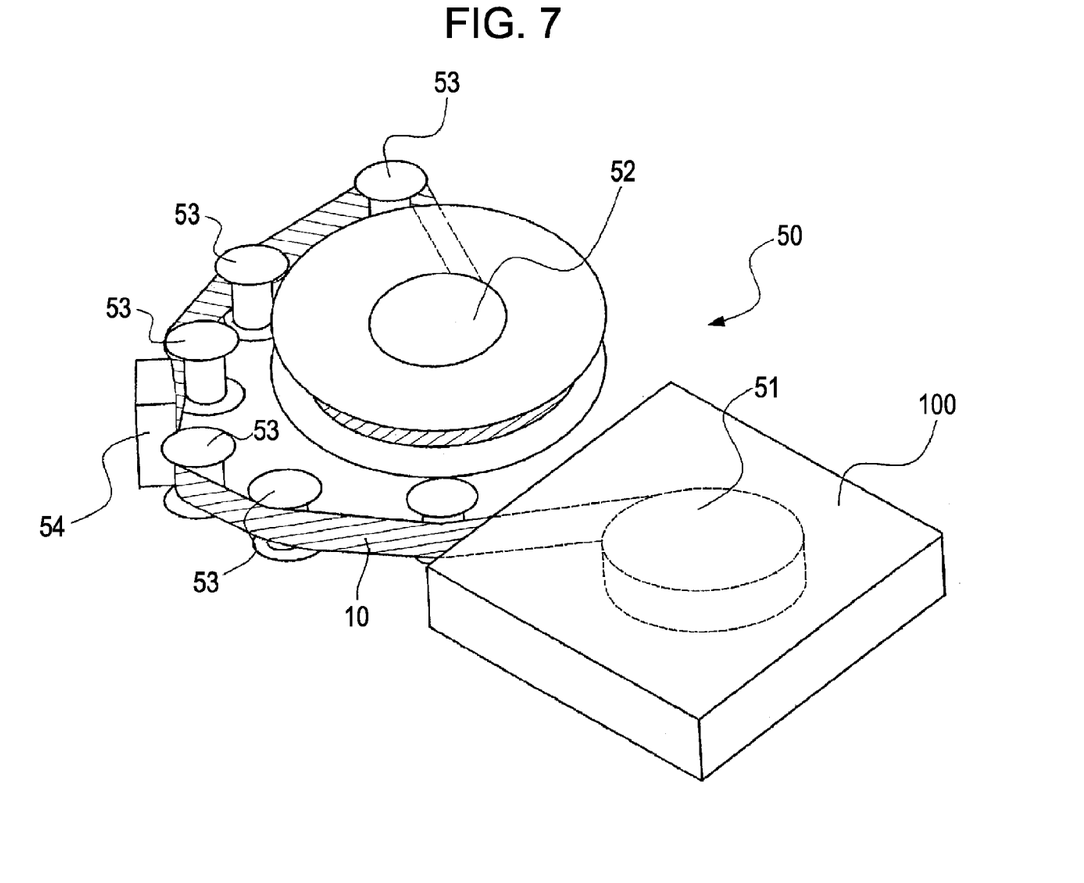
FIG. 7 is a sectional view showing a configuration of a magnetic recording/reproducing system according to an embodiment of the present invention.

A magnetic recording/reproducing system according to another embodiment of the present invention includes a linear running mechanism (a take-off roll, a take-up roll, and a guide roll) for running the above-described magnetic recording medium in both the forward and backward directions along the longitudinal direction of the magnetic recording medium so that signal recording and reproduction are performed in the longitudinal direction, and a magnetic head unit (FIG. 7).

The magnetic head unit preferably includes a plurality of magnetic heads disposed corresponding to a plurality of tracks which are provided by dividing the magnetic recording medium in the width direction thereof.

The magnetic recording medium includes the vertical magnetic layer having predetermined magnetic characteristics as a magnetic layer and is thus suitable for linear-system recording and reproduction in which the magnetic recording medium is run in both the forward and backward directions along the longitudinal direction. In addition, such a vertical magnetic layer may be formed by a simple method.

The magnetic recording/reproducing system uses the magnetic recording medium according to an embodiment of the present invention. Therefore, the system is suitable for recording and reproduction in both the forward and backward running directions along the longitudinal direction and may be used as high-recording density tape streamer.

DESCRIPTION OF THE PREFERRED EMBODIMENTS

The configuration of a magnetic recording medium according to an embodiment of the present invention is described below. Note that although the present invention is described with reference to an embodiment shown in the drawings, the present invention is not limited to this embodiment, and appropriate changes may be made according to an embodiment. Any embodiment is included in the scope of the present invention as long as the operation and advantages of the present invention are exhibited.

FIG. 3 is a schematic sectional view showing an example of a magnetic recording medium according to an embodiment of the present invention.

As shown in FIG. 3, a magnetic recording medium 10 includes a deposited tape having a configuration in which a vertical magnetic layer 2 and a protective layer 3 are formed in order on a long (tape-shaped) nonmagnetic support 1.

According to demand, a lubricant layer 4 may be formed on the protective layer 3 using a predetermined lubricant. In addition a back coat layer 5 may be formed on the surface of the nonmagnetic support 1 opposite to the surface on which the vertical magnetic layer 2 is formed.

In the magnetic recording medium 10, the vertical magnetic layer 2 is formed by vapor deposition. In FIG. 3, arrows A and B indicate the longitudinal direction of the magnetic recording medium and are opposite to each other. As shown in FIG. 3, the angle formed by the longitudinal direction of the magnetic recording medium 10 and the direction of applied magnetic field H is applied magnetic field angle θ. The coercive force Hc of the vertical magnetic layer 2 varies depending on the applied magnetic field angle θ in a plane perpendicular to the vertical magnetic layer 2 and including the longitudinal direction of the magnetic recording medium 10, i.e., a plane parallel to the section shown in FIG. 3.

It is assumed that the maximum coercive force obtained by changing the applied magnetic field angle θ from 0° to 180° is Hcmax, and the coercive force at the applied magnetic field angle θ of 0°, i.e., the coercive force in the longitudinal direction of the magnetic recording medium 10, is Hc0. The magnetic recording medium 10 according to this embodiment is a medium for so-called vertical magnetic recording with the coercive force Hcmax at about 90°. The coercive force Hcmax is preferably at the applied magnetic field angle in the range of 83° to 105°.

Therefore, when recording and reproduction are performed by relatively moving a head and the magnetic recording medium 10 in the direction of arrow A and the direction of arrow B, a difference between the recording/reproducing characteristics in both directions is in a range suitable for linear-system recording and reproduction.

Figure 4:
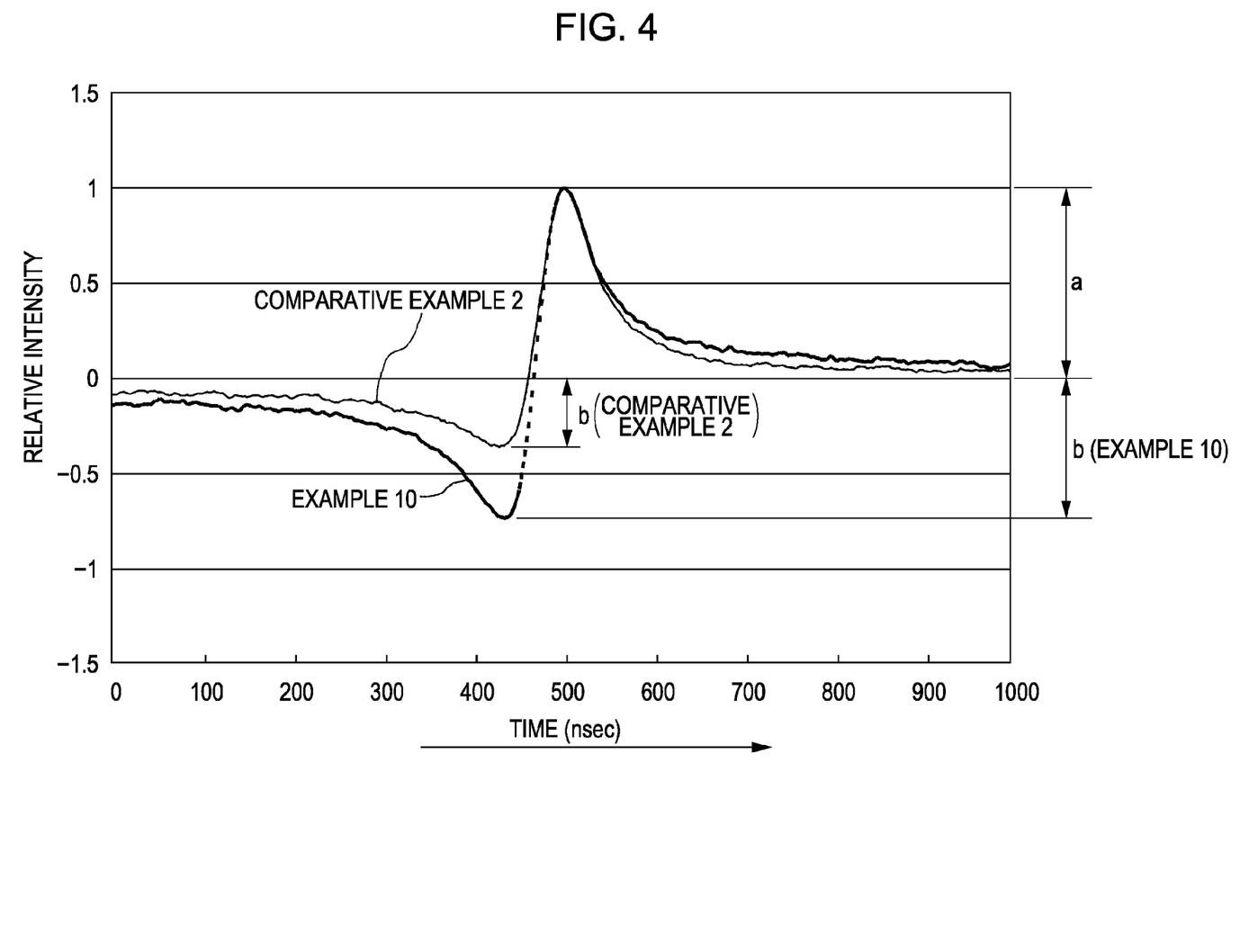
FIG. 4 is a diagram illustrating a dipulse ratio on the basis of an isolated wave of a vertical magnetic layer.

FIG. 4 shows an example of an isolated reproduced wave of a signal recorded at a recording wavelength of 5 μm. A recorded signal with an isolated reproduced waveform has an input waveform corresponding to a step signal at the rising edge. In this case, an isolated reproduced waveform recorded with a ring head having a gap length of 0.13 μm changes from the right to the left along the time axis, while the output changes in the minus direction to reach minus peak b and then changes abruptly in the plus direction to output peak a. The dipulse ratio is defined as the following expression (2):

$$\text{Dipulse ratio} = b/a \quad (2)$$

The isolate reproduced waveform shown as an example is normalized with the output peak a. In FIG. 4, for example, in the waveform obtained with a sample of Example 10 which will be described below, the dipulse ratio is 0.65 because the output peak a corresponds to 1 due to normalization, and the minus peak b shown by b(10) is 0.65. On the other hand, in the waveform obtained with a sample of Comparative Example 2 which will be described below, the minus peak is as shown by b (Comparative Example 2) and the dipulse ratio is 0.26. When the dipulse ratio is 0.3 or less, substantially the same characteristics as those of an obliquely deposited tape are exhibited, increasing a difference between the characteristics in the forward and backward directions. In the present invention, the dipulse ratio of the vertical magnetic layer 2 is 0.36 or more in both the case in which the magnetic recording medium 10 is run in the forward direction A along the longitudinal direction and the case in which the magnetic recording medium 10 is run in the backward direction B along the longitudinal direction.

Figure 5:
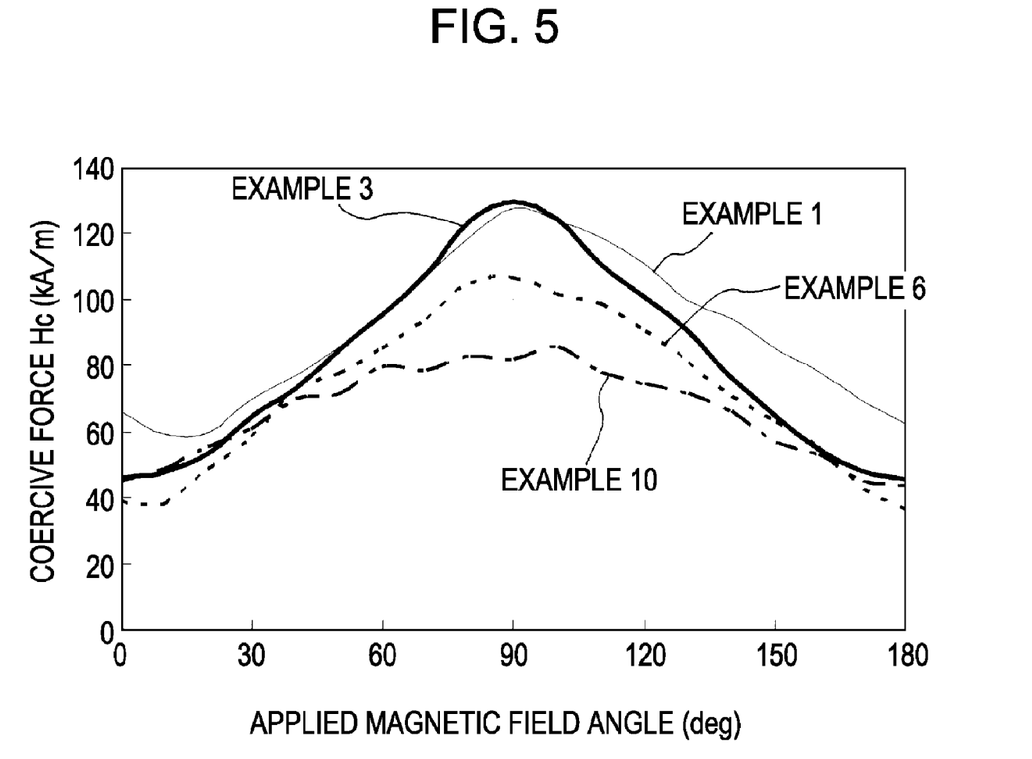
FIG. 5 is a characteristic diagram showing the dependency of coercive force on applied magnetic field angle of a magnetic recording medium according to an embodiment of the present invention.

FIG. 5 is a graph showing the dependency of coercive force on applied magnetic field angle of a magnetic recording medium according to an embodiment of the present invention. This figure shows a relationship between coercive force and the applied magnetic field angle of each of samples of Examples 1, 3, 6, and 10 which will be described below. As in a deposited tape, in a structure in which ferromagnetic fine particles are aligned to some extent at a specified angle, the coercive force is minimized at an angle of 90° with the easy magnetization axis. This corresponds to the minimum point in the applied magnetic field angle range of 0° to 30° shown in FIG. 5. On the other hand, at the maximum point produced on both sides (near θ=90° in FIG. 5) of the minimum point, magnetic fine particles have high interaction in the easy magnetization axis.

When magnetic characteristics are measured using a vibrating sample magneto meter (abbreviated as "VSM" hereinafter), generally, forward and backward magnetic fields are used as a characteristic of the VSM. Therefore, when a sample is set in VSM and measured at 0°, consequently the sample is simultaneously measured in the opposite direction, i.e., at 180°. Although a general physical phenomenon at 0° is the same as at 360°, the result measured at 0° by VSM is physically the same as at 180°. In the present invention, a direction defined as minus numerically represents an angle obtained by subtracting a certain value from 180°. For example, the expression "minus 30°" represents 150°=(180−30)°.

As magnetic anisotropy in an oblique direction of a magnetic layer increases, a difference between the outputs of recording and reproduction in the forward and backward directions increases. In comparison between the output peak a and the minus peak b, an output difference between the output peaks a in both directions is smaller than that between the minus peaks b. As described above, when an evaporated tape including a single magnetic layer is used for linear-system recording and reproduction, a difference between the recording/reproduction characteristics in both directions becomes a problem. However, when the coercive force of a magnetic layer is maximized Hcmax at 83 to 105° (about 90°) and minimized Hcmin within the range of 0±30°, a difference between the recording/reproduction characteristics in both directions may be decreased, thereby achieving desired reproduced output. When the magnetic recording medium according to an embodiment of the present invention is applied to a tape streamer and various linear-system magnetic recording/reproducing systems, high-density recording may be realized.

Next, each of the layers which constitute the magnetic recording medium 10 according to the embodiment of the present invention will be described in detail.

As the nonmagnetic support 1, any one of various materials used for magnetic tapes may be used. Examples of such materials include polyesters such as polyethylene terephthalate (PET), polyethylene naphthalate (PEN), and the like; polyolefins such as polyethylene, polypropylene, and the like; cellulose derivatives such as cellulose triacetate and the like; and plastics such as polycarbonate, polyimide, polyamide, polyamide-imide, and the like. Among these, PET is mort preferred as the low-cost nonmagnetic support 1.

In addition, an underlying layer is preferably formed between the nonmagnetic support 1 and the vertical magnetic layer 2, resulting in improvement of durability and running performance of the final magnetic recording medium 10 and handling properties in deposition of a magnetic tape. For example, the underlying layer is formed using a coating material containing a binder resin, a filler, and a surfactant to add micro irregularity to the surface and enhance mechanical strength.

As the binder resin for forming the underlying layer, for example, an aqueous polyester resin, an aqueous acrylic resin, an aqueous polyurethane, or the like may be used. As the filler, for example, organic polymer particles, silicon dioxide or calcium carbonate particles, or the like may be used. The average particle size of the filler is preferably, for example, 5 to 30 nm, and the density of surface projections formed by the filler is preferably, for example, about 500,000 to 30,000,000/mm$^2$.

The average particle size of the filler constituting the underlying layer and the density of surface projections formed by the filler may be appropriately determined in a range in which the running durability and electromagnetic conversion characteristics of the magnetic recording medium 10 as a final product are improved. Alternatively, irregularity may be artificially formed on the nonmagnetic support 1 by lithography or micro projections composed of a metal, an inorganic compound, or an organic polymer may be formed by a plating or vacuum thin-film forming technique.

The vertical magnetic layer 2 is formed by vacuum vapor deposition in which a ferromagnetic metal material is evaporated by heating and deposited under vacuum and thus has a vertical film structure in which as a whole, the crystal growth direction coincides with the thickness direction of the vertical magnetic layer 2. The present invention uses a production method for forming a magnetic layer by depositing magnetic fine particles on a main surface of the nonmagnetic support 1 while running the long nonmagnetic support 1 in the longitudinal direction. This method has the advantages of good film forming properties, high productivity, and easy operationality.

Figure 6:
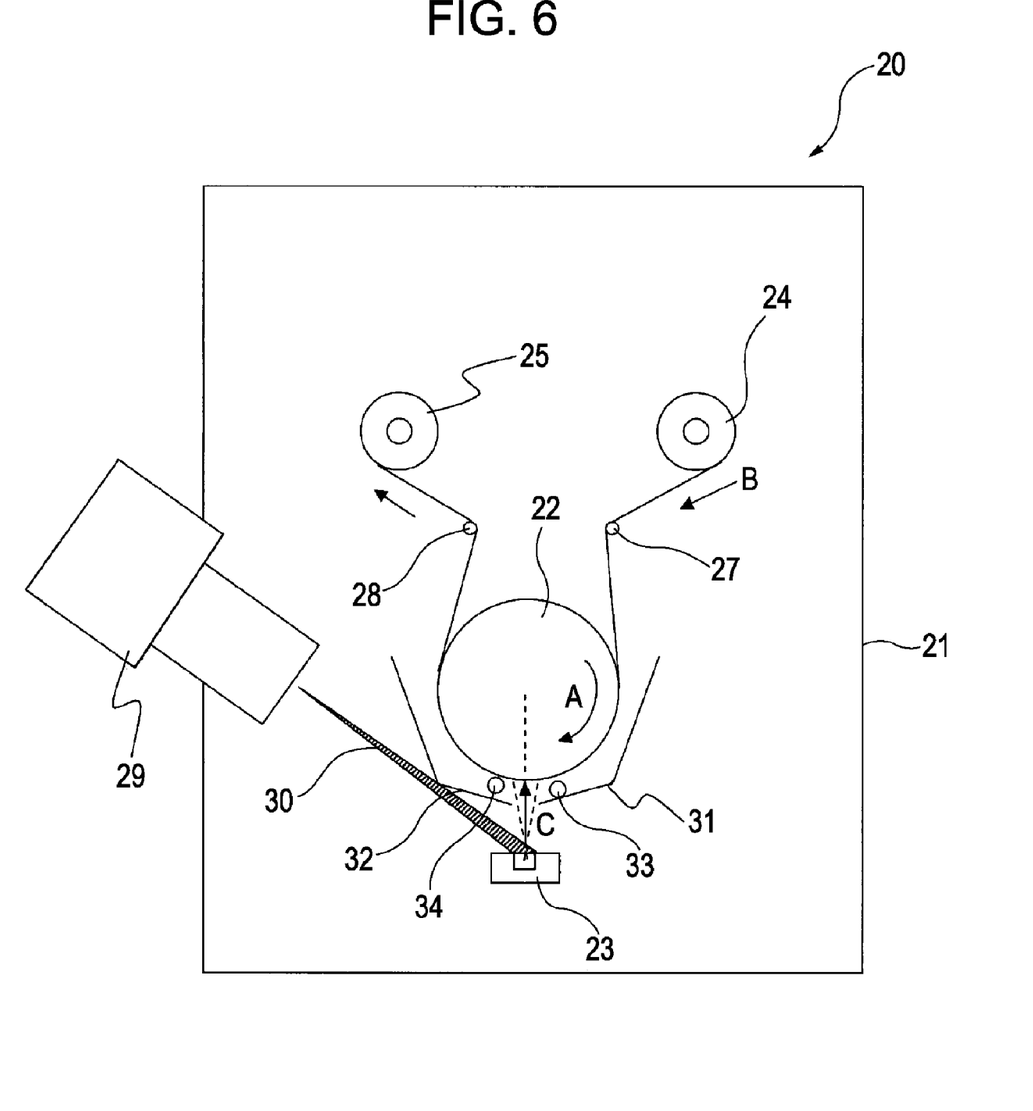
FIG. 6 is a schematic drawing showing a configuration of a vacuum evaporator for forming a vertical magnetic layer of a magnetic recording medium according to an embodiment of the present invention.

As a vacuum evaporator for forming the vertical magnetic layer 2, a continuous take-up type vacuum evaporator 20 shown in FIG. 6 may be used. A vacuum chamber 21 of the vacuum evaporator 20 is configured for vertical deposition, and the inside thereof is evacuated to, for example, about $1\times10^{-3}$ Pa. In the vacuum chamber 21, a cooling can 22 and an evaporation source 23 are disposed. The cooling can 22 is cooled to, for example, about $-10°$ C., and rotated in a direction shown by arrow A in FIG. 6. The evaporation source 23 is disposed opposite to the cooling can 22.

In addition, a supply roll 24 and a take-up roll 25 are disposed in the vacuum chamber 21. The nonmagnetic support 1 is delivered from the supply roll 24 in a direction shown by arrow B in FIG. 6, run along the peripheral surface of the cooling can 22, and then taken up by the take-up roll 25.

Further, guide rollers 27 and 28 are disposed between the supply roll 24 and the cooling can 22 and between the cooling can 22 and the take-up roll 25, respectively. The guide roller 27 adjusts the tension of the nonmagnetic support 1 run from the supply roll 24 to the cooling can 22. The guide roller 28 adjusts the tension of the nonmagnetic support 1 run from the cooling can 22 to the take-up roll 25. As a result, the nonmagnetic support 1 is smoothly run.

The evaporation source 23 includes a ferromagnetic metal material such as Co or the like which is contained in a container such as a crucible. In addition, an electron beam generation source 29 is disposed on the vacuum evaporator 20, for heating and evaporating the ferromagnetic metal material of the evaporation source 23. The ferromagnetic metal material of the evaporation source 23 is evaporated as shown by arrow C in the drawing by accelerated irradiation of the ferromagnetic metal material of the evaporation source 23 with an electron beam 30 emitted from the electron beam generation source 29. The ferromagnetic metal material is deposited on the nonmagnetic support 1 which is run along the peripheral surface of the cooling can 22 facing the evaporation source 23 to form a ferromagnetic metal thin film.

Further, a first shutter 31 and a second shutter 32 are disposed between the evaporation source 23 and the cooling can 22. The first shutter 31 is positioned on the upstream side of the nonmagnetic support 1 and the second shutter 32 is positioned on the downstream side of the nonmagnetic support 1. The first shutter 31 and the second shutter 32 expose only a predetermined region to the outside (an atmosphere in which the ferromagnetic metal material is evaporated) of the nonmagnetic support 1 run along the peripheral surface of the cooling can 22. That is, an incidence angle of vapor of the ferromagnetic metal material on the nonmagnetic support 1 is limited by the first shutter 31 and the second shutter 32.

In vapor deposition of the ferromagnetic metal thin film, oxygen gas is supplied through an oxygen gas inlet (not shown) to a portion on which the ferromagnetic metal material is incident near the surface of the nonmagnetic support 1. Therefore, oxygen is introduced into a magnetic layer to be formed. The magnetic anisotropy of an obliquely deposited tape may be suppressed by optimizing the amount of oxygen introduced, thereby producing a deposited tape suitable for linear-system recording and reproduction.

The durability and weather resistance of the ferromagnetic metal thin film may be improved by appropriately controlling oxidation of the magnetic layer. Instead of heating with the electron beam, for example, resistance heating, radio-frequency heating, laser heating, or the like may be used for heating the evaporation source. However, in view of controllability of beam, the electron beam heating method is preferred, and resistance heating, radio-frequency heating, or laser heating is preferably combined as an auxiliary heating method.

In the vacuum evaporator 20 configured as described above, the ferromagnetic metal material is evaporated from the evaporation source 23, and at the same time, the nonmagnetic support 1 is run on the peripheral surface of the cooling can 22. The evaporated ferromagnetic metal material is deposited only on a portion exposed outward between the first and second shutter 31 and 32.

In the vacuum evaporator 20, the nonmagnetic support 1 is run from the first shutter 31 side to the second shutter 32 side so that the evaporated ferromagnetic metal material is first deposited on the nonmagnetic support 1 on the first shutter 31 side. Then, the evaporated ferromagnetic metal material is successively deposited with running of the nonmagnetic support 1 from the first shutter 31 side to the second shutter 32 side. Therefore, the vertical magnetic layer 2 formed by the above-described deposition method including limiting the incidence angle of the magnetic fine particles has a vertical film structure as a whole (FIG. 3) but tends to microscopically have an oblique structure portion according to the shutter angle. An optimum film structure may be realized by controlling the vertical portion and the oblique portion. For example, as shown in FIG. 3, the vertical magnetic layer 2 has, near the surface of the nonmagnetic support 1, a film structure slightly inclined in the arrow A direction, which is a planar direction (longitudinal direction of the magnetic recording medium). The structure gradually becomes vertical away from the surface of the nonmagnetic support 1. The vertical magnetic layer 2 has, near the surface of the vertical magnetic layer 2, a structure gradually inclined in the arrow B direction opposite to the arrow A direction closer to the surface of the vertical magnetic layer 2. In addition, coercive force Hc, residual magnetization Mr, the surface oxide layer, and the like may be controlled by appropriately controlling oxygen inlet tubes 33 and 34, thereby producing an optimum magnetic film.

The magnetic recording medium according to the embodiment of the present invention is suitable for a recording/reproducing apparatus having a MR head or a GMR head, and thus the vertical magnetic layer 2 is preferably very thin in order to decrease noise and improve the C/N ratio. Therefore, the thickness of the vertical magnetic layer 2 is preferably 40 to 100 nm so that Mr·t is 3 mA to 12 mA.

When the thickness of the vertical magnetic layer 2 is less than 40 nm, the crystal growth property is degraded because the magnetic layer is very thin, thereby failing to achieve sufficient magnetic characteristics for a high C/N ratio. When the thickness of the vertical magnetic layer 2 exceeds 100 nm, the saturation phenomenon of the head becomes significant, and a desired recording density may not be achieved when the MR head or GMR head is applied.

As the ferromagnetic metal material for forming the vertical magnetic layer 2, any one of metal materials and magnetic alloys used for producing such a magnetic recording medium may be used. Examples of such materials include ferromagnetic metals such as Co, Ni, and the like; various materials such as Co—Ni alloys, Co—Fe alloys, Co—Ni—Fe alloys, Co—Cr alloys, Co—Pt alloys, Co—Pt—B alloys, Co—Cr—Ta alloys, Co—Cr—Pt—Ta alloys, and the like; oxygen-containing films formed by depositing these materials in an oxygen atmosphere; and these materials further containing at least one other element. However, a practically usable metal is Co—O or $(Co_x—Ni_{(1-x)})$—O wherein x=0 to 1.0, and ferromagnetic metal Co—O in which a magnetization component is maximized is preferred.

In the magnetic recording medium 10 of this embodiment, beside the underlying layer, an intermediate layer (not shown) may be formed between the vertical magnetic layer 2 and the nonmagnetic support 1 by the vacuum thin-film forming technique in order to made fine crystal grains of the vertical magnetic layer 2 and improve the orientation thereof.

Examples of the vacuum thin-film forming technique include so-called physical vapor deposition methods (PVD) such as a vacuum evaporation method of heat-evaporating a predetermined material in vacuum to deposit the material on a substance to be treated, an ion plating method of evaporating a predetermined material in discharge, a sputtering method of producing glow discharge in an atmosphere mainly composed of argon to sputter surface atoms of a target with the produced argon ions, and the like.

Examples of a material constituting the intermediate layer include metal materials such as Co, Cu, Ni, Fe, Zr, Pt, Au, Ta, W, Ag, Al, Mn, Cr, Ti, V, Nb, No, Ru, and the like; alloys composed of a combination of any two or more of these metal materials; compounds of these metal materials and oxygen or nitrogen; compounds such as silicon oxide, silicon nitride, ITO (indium tin oxide), $In_2O_3$, Zr, and the like; carbon; diamond-like carbon (DLC), and the like.

In order to secure high running durability and weather resistance, the protective layer 3 composed of DLC is preferably formed on the vertical magnetic layer 2. The protective layer 3 may be formed by a CVD (chemical vapor deposition) method using, for example, a plasma CVD continuous film forming apparatus.

As the CVD method, any one of a mesh electrode DC plasma method, an electron-beam-excited plasma source method, a cold-cathode ion source method, an ionization vapor deposition method, a catalytic CVD method, and the like may be used. As a carbon compound used in the CVD method, any one of materials such as hydrocarbons, ketones, alcohols, and the like may be used. In forming a plasma, Ar, $H_2$, or the like may be introduced as a gas for accelerating differentiation of the carbon compound.

In addition, the lubricant layer 4 may be formed by applying a desired lubricant, for example, perfluoropolyether, in order to improve the running property. Further, the back coat layer 5 is formed on the surface opposite to the surface of the nonmagnetic support 1 on which the vertical magnetic layer 2 is formed, for improving the running property and imparting the antistatic property.

The thickness of the back coat layer 5 is preferably about 0.1 to 0.7 μm. The back coat layer 5 is formed by, for example, applying a back coating material on the back surface of the nonmagnetic support 1, the coating material being prepared by dispersing solid particles such as inorganic pigment or the like in a binder and kneading the resultant dispersion with an organic solvent according to the type of the binder used.

The magnetic recording medium 10 according to the embodiment of the present invention which is produced as described above is suitable as a magnetic recording medium for a linear-system magnetic recording/reproducing system using a MR head.

A magnetic recording/reproducing system (linear tape system) according to an embodiment of the present invention is described below.

FIG. 7 is a schematic view showing an example of the configuration of a magnetic recording/reproducing system according to an embodiment of the present invention.

A magnetic recording/reproducing system 50 is a magnetic recording/reproducing apparatus for recording and reproducing signals in a linear system on and from the magnetic recording medium 10 (magnetic tape) including the vertical magnetic layer 2 which is formed by vapor deposition on the nonmagnetic support 1 as described above.

The magnetic recording/reproducing system 50 includes a take-off roll 51 for taking off the magnetic recording medium 10 from a cassette 100 in which the magnetic recording medium 10 is accommodated, a take-up roll 52, and a magnetic recording medium running mechanism composed of guide rolls 53 which are disposed between the take-off roll 51 and the take-up roll 52 at predetermined intervals in order to impart predetermined tension to the magnetic recording medium 10 and to run the magnetic recording medium 10 in a desired direction. In addition, a magnetic head unit 54 including a recording magnetic head and a reproducing magnetic head for recording and reproducing signals on and from the vertical magnetic layer 2, which is formed on the main surface of the magnetic recording medium 10, is disposed between the guide rolls 53 so that recording and reproduction may be performed by running the magnetic recording medium 10 in both the forward and backward directions.

The magnetic head unit 54 includes the recording magnetic head and the reproducing magnetic head as a pair of magnetic heads for running of the magnetic recording medium 10 in any one of the forward direction (tape take-off direction) and the backward direction (tape take-up direction). A plurality of magnetic head pairs is disposed in the width direction of the magnetic recording medium 10. In other words, the pairs of the magnetic heads are provided according to a plurality of divided tracks which are provided in the width direction of the magnetic recording medium 10, thereby permitting simultaneous recording or reproduction for the tracks.

Figure 8:
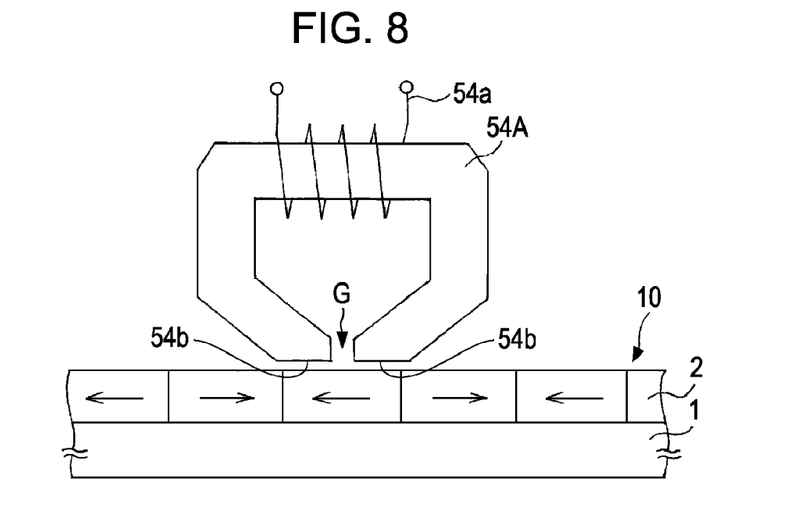
FIG. 8 is a schematic drawing showing a configuration of a magnetic recording medium and a recording magnetic head.

FIG. 8 shows an example of the configuration of the recording magnetic head.

A recording magnetic head 54A is a MIG (metal in gap) head including a ring member which is partially open to form a gap G, and a coil 54a wound on the ring member, a metal soft magnetic layer 54b being formed in the core gap of the magnetic head 54A.

A material for the metal soft magnetic layer 54b of the core gap is adapted to increase the saturation magnetic flux density. Examples of the material include CoZrNb, FeAlSi, NiFe, FeGaSiRu, FeTaC, CoNiFeB, CoFeB, CoNiFeS, CoNiFeC, FeTaN, FeAlN, FeRhN, FeMoN, FeZrN, FeSiN, and the like. However, the material for the metal soft magnetic layer 54b is not limited to these examples.

In the present invention, recording in any one of the forward and backward running directions is performed using the same recording magnetic head 54A with the same recording current.

As the reproducing magnetic head, a magnetoresistive magnetic head (MR head) serving as a magnetic head only for reproduction, for example, an anisotropic magnetoresistive head (AMR head) or a giant magnetoresistive head (GMR head), which detects signals from a magnetic recording medium using the magnetoresistive effect, may be used. The MR head has higher sensitivity and higher reproduced output than an inductive magnetic head for recording and reproduction using electromagnetic induction and is thus suitable for a high-recording density magnetic recording medium.

The MR head is provided with a substantially rectangular MR element which is sandwiched, through an insulator, between a pair of magnetic shields composed of a soft magnetic material such as Ni—Zr polycrystalline ferrite. Further, a pair of terminals are led out from both ends of the MR element so that a sense current is supplied to the MR element through the terminals.

When signals are reproduced from the magnetic recording medium 10 using the MR head, the MR element is slid on the tape surface of the magnetic recording medium 10. In this state, a sense current is supplied to the MR element through the terminals connected to both ends of the MR element to detect a voltage change of the sense current.

When the sense current is supplied to the MR element in a state of being slid on the magnetic recording medium, the magnetization direction of the MR element changes according to the magnetic field supplied from the magnetic recording medium to change the relative angle between the sense current supplied to the MR element and the magnetization direction. As a result, the resistance value changes depending on the relative angle between the magnetization direction of the MR element and the direction of the sense current.

Therefore, when the value of the sense current supplied to the MR element is constant, a voltage change occurs in the sense current. Thus, a signal magnetic field from the magnetic recording medium is detected by detecting the voltage change of the sense current, reproducing a signal recorded on the magnetic recording medium.

As a method for applying a bias magnetic field to the MR element, any one of various methods such as a SAL (soft adjacent layer) bias method, a permanent magnet bias method, a shunt current bias method, a self-bias method, an exchange bias method, a barber-pole method, a divided element method, a servo-bias method, and the like may be used. The giant magnetoresistive element and various bias methods are described in detail in, for example, "2nd edition, Magneto-resistive Heads and Spin Valve Heads", Fundamentals & Applications, (translated by Kazuhiko Hayashi, issued by Maruzen Co., Ltd., 2002).

EXAMPLES

Examples of a magnetic recording medium according to an embodiment of the present invention are described on the basis of experimental results.

Example 1

A polyethylene terephthalate (PET) film (nonmagnetic film) having a thickness of 6.0 µm and a width of 150 mm was prepared as a raw material of the nonmagnetic support 1 shown in FIG. 3. Then, an underlying layer was formed to a thickness of 10 nm on the magnetic layer forming surface of the nonmagnetic film. The underlying layer was formed by applying on the nonmagnetic film a coating material containing a water-soluble latex mainly composed of acryl ester and silica particles dispersed therein. The silica particles used had a diameter of 10 nm and the density of the silica particles on the nonmagnetic film was about $3\times10^7/mm^2$.

Next, the vertical magnetic layer 2 was formed using the vacuum evaporator 20 shown in FIG. 6. Specifically, Co as a metal magnetic material used as a raw material was heated by irradiation with the electron beam 30 from the electron beam generation source 29 while oxygen gas was introduced from the oxygen gas inlet tubes 33 and 34 in the same amount of $5.0\times10^{-4}$ $m^3$/min on the inlet and outlet sides to form a Co—CoO magnetic layer by reactive vacuum evaporation. The vertical magnetic layer 2 was formed at a nonmagnetic film feed rate of 50 m/min so that the thickness was 50 nm. In this case, the maximum incidence angle of Co evaporated particles was adjusted to ±6.5° by the first and second shutters 31 and 32.

Next, the protective layer 3 including a DLC film was formed to a thickness of 10 nm by plasma CVD on the vertical magnetic layer 2 formed as described above. Further, a perfluoropolyether lubricant was applied on the protective layer 3 to form the lubricant layer 4 having a thickness of 2 nm.

In addition, a back coating material containing carbon particles and urethane resin was applied to the surface of the nonmagnetic film opposite to the surface on which the vertical magnetic layer 2 had been formed to form the back coat layer 5 having a thickness of 0.3 µm. The carbon particles used had an average particle size of 35 nm. The back coating material was applied by a direct gravure method using a coater.

The original tape of the intended magnetic recording medium 10 produced by the above-described steps was cut into a ½ inch width, thereby preparing a magnetic recording medium (magnetic tape) as a sample.

Example 2

A sample was prepared by the same method as in Example 1 except that the amounts of oxygen introduced from the oxygen inlet tubes 33 and 34 during the formation of the magnetic layer were $8.0\times10^{-4}$ $m^3$/min.

Example 3

A sample was prepared by the same method as in Example 1 except that the amounts of oxygen introduced from the oxygen inlet tubes 33 and 34 during the formation of the magnetic layer were $1.0\times10^{-4}$ $m^3$/min.

Example 4

A sample was prepared by the same method as in Example 1 except that the amounts of oxygen introduced from the oxygen inlet tubes 33 and 34 during the formation of the magnetic layer were $8.0 \times 10^{-4}$ m³/min and $1.0 \times 10^{-4}$ m³/min, respectively.

Example 5

A sample was prepared by the same method as in Example 1 except that the amounts of oxygen introduced from the oxygen inlet tubes 33 and 34 during the formation of the magnetic layer were $1.0 \times 10^{-4}$ m³/min and $8.0 \times 10^{-4}$ m³/min, respectively.

Example 6

A sample was prepared by the same method as in Example 1 except that the aperture angles of the first shutter 31 ad the second shutter 32 were 6.5° and 4.0°, respectively.

Example 7

A sample was prepared by the same method as in Example 1 except that the aperture angles of the first shutter 31 ad the second shutter 32 were 6.5° and 3.0°, respectively.

Example 8

A sample was prepared by the same method as in Example 1 except that the nonmagnetic support feed rate was 25 m/min so that the thickness of the vertical magnetic layer 2 was 100 nm.

Example 9

A sample was prepared by the same method as in Example 1 except that the nonmagnetic support feed rate was 62.5 m/min so that the thickness of the vertical magnetic layer 2 was 40 nm.

Example 10

A sample was prepared by the same method as in Example 1 except that the amounts of oxygen introduced from the oxygen inlet tubes 33 and 34 during the formation of the magnetic layer were $0.0 \times 10^{-4}$ m³/min (without introduction of oxygen gas) and $8.0 \times 10^{-4}$ m³/min, respectively.

Comparative Example 1

A sample was prepared by the same method as in Example 1 except that the aperture angles of the first shutter 31 ad the second shutter 32 were 6.5° and 2.0°, respectively.

Comparative Example 2

A sample was prepared by the same method as in Example 1 except that the amounts of oxygen introduced from the oxygen inlet tubes 33 and 34 during the formation of the magnetic layer were $8.0 \times 10^{-4}$ m³/min and $0.0 \times 10^{-4}$ m³/min (without introduction of oxygen gas), respectively.

Reference Example 1

A sample was prepared by the same method as in Example 1 except that the amounts of oxygen introduced from the oxygen inlet tubes 33 and 34 during the formation of the magnetic layer were $10.0 \times 10^{-4}$ m³/min.

Reference Example 2

A sample was prepared by the same method as in Example 1 except that the nonmagnetic support feed rate was 20 m/min so that the thickness of the vertical magnetic layer 2 was 125 nm.

Reference Example 3

A sample was prepared by the same method as in Example 1 except that the nonmagnetic support feed rate was 83 m/min so that the thickness of the vertical magnetic layer 2 was 30 nm.

Each of the magnetic tape samples prepared as described above was evaluated by the methods described below with respect to magnetic characteristics and electromagnetic conversion characteristics.

(1) Magnetic Characteristics

As a magnetic characteristic, a sample was rotated in an applied external magnetic field to measure a hysteresis loop at each angle using VSM (vibrating sample magneto meter) and measure the dependency of coercive force on the applied magnetic field angle. In addition, residual magnetization Mr and an isolated reproduced wave of a signal recorded at a recording wavelength of 5 µm in each of the forward and backward running directions were measured. Further, the dipulse ratio in each of the forward and backward running directions was determined. The forward direction represents the running direction in vapor deposition with the vacuum evaporator shown in FIG. 6, and the backward direction represents the direction opposite to the running direction in vapor deposition.

(2) Electromagnetic Conversion Characteristics

The electromagnetic conversion characteristics were evaluated using a drum tester and a MIG (Metal-in-Gap) head with a gap length of 0.22 µm and a track width of 20 µm as a recording head. In order to evaluate the electromagnetic conversion characteristics, a signal was recorded on each magnetic tape sample wound on the drum using the MIG head at a recording wavelength of each of 1.0 µm and 0.3 µm and reproduced with a NiFe MR head having a track width of 5 µm to measure carrier outputs. During the measurement, the magnetic tape and the magnetic head were relatively operated in each of the forward and backward directions. The recording current of the recording head was a value at which the reproduced output measured for each sample in the forward direction was maximized, and the recording current was kept in measurement in the backward direction. In addition, a difference between the outputs of signals recorded at a recording wavelengths of 0.3 µm and 0.6 µm in recording and reproduction in the forward direction was determined relative to (output at recording wavelength of 0.3 µm)−(output at recording wavelength of 0.6 µm) in Example 1 as a reference (0 dB). When (output at recording wavelength of 0.3 µm)−(output at recording wavelength of 0.6 µm) of a sample was minus with respect to that in Example 1 (reference), the degree of output deterioration at a shorter wavelength was considered as larger than in Example 1. In addition, the relative speed between the magnetic tape and the MR head was 7 m/sec.

Table 1 shows the main production conditions and the evaluation results of the magnetic characteristics of Examples 1 to 10, Comparative Examples 1 and 2, and Reference Examples 1 to 3. Table 2 shows the evaluation results of the electromagnetic conversion characteristics of these examples.

TABLE 1

| | Amount of oxygen introduced (inlet/outlet) ($\times 10^{-4}$ m³/min) | Shutter aperture angle (inlet/outlet) (degree) | Thickness of vertical magnetic layer (nm) | $Mr \cdot t$ (mA) | Dipulse ratio Forward direction | Dipulse ratio Backward direction | Hcmax (kA/m) | θ(Hcmax) (degree) | θ(Hcmin) (degree) |
|---|---|---|---|---|---|---|---|---|---|
| Example 1 | 5.0/5.0 | +6.5/−6.5 | 53 | 6.0 | 0.61 | 0.63 | 125 | 90 | 0 |
| Example 2 | 8.0/8.0 | +6.5/−6.5 | 55 | 4.5 | 0.62 | 0.66 | 145 | 90 | 0 |
| Example 3 | 1.0/1.0 | +6.5/−6.5 | 47 | 7.6 | 0.57 | 0.59 | 107 | 90 | 0 |
| Example 4 | 8.0/1.0 | +6.5/−6.5 | 48 | 5.6 | 0.56 | 0.48 | 122 | 95 | 24 |
| Example 5 | 1.0/8.0 | +6.5/−6.5 | 49 | 4.8 | 0.47 | 0.41 | 132 | 86 | −30 |
| Example 6 | 5.0/5.0 | +6.5/−4.0 | 52 | 6.8 | 0.54 | 0.50 | 127 | 87 | −18 |
| Example 7 | 5.0/5.0 | +6.5/−3.0 | 55 | 7.2 | 0.44 | 0.36 | 128 | 83 | −30 |
| Example 8 | 5.0/5.0 | +6.5/−6.5 | 100 | 12.0 | 0.55 | 0.65 | 102 | 90 | 0 |
| Example 9 | 5.0/5.0 | +6.5/−6.5 | 40 | 3.0 | 0.61 | 0.63 | 155 | 90 | 0 |
| Example 10 | 0.0/8.0 | +6.5/−6.5 | 51 | 7.2 | 0.65 | 0.71 | 105 | 105 | 30 |
| Comparative Example 1 | 5.0/5.0 | +6.5/−2.0 | 52 | 6.2 | 0.20 | 0.16 | 105 | 82 | −35 |
| Comparative Example 2 | 8.0/0.0 | +6.5/−6.5 | 46 | 7.3 | 0.26 | 0.22 | 62 | 81 | −34 |
| Reference Example 1 | 10.0/10.0 | +6.5/−6.5 | 56 | 2.8 | 0.64 | 0.68 | 158 | 90 | 0 |
| Reference Example 2 | 5.0/5.0 | +6.5/−6.5 | 125 | 15.0 | 0.54 | 0.64 | 93 | 90 | 0 |
| Reference Example 3 | 5.0/5.0 | +6.5/−6.5 | 30 | 2.5 | 0.63 | 0.69 | 137 | 90 | 0 |

Hcmax: maximum coercive force
θ(Hcmax): applied magnetic field angle when coercive force is maximized
θ(Hcmin): applied magnetic field angle when coercive force is minimized

TABLE 2

| | Signal at recording wavelength of 0.3 μm | | | | Output difference between signals at recording wavelengths of 1.0 μm and 0.3 μm | |
|---|---|---|---|---|---|---|
| | Output difference with Example 1 (dB) | Output difference between forward and backward running directions (dB) | CN ratio difference with Example 1 (dB) | CN ratio difference between forward and backward running directions (dB) | Output difference with Example 1 (dB) | Output difference between forward and backward running directions (dB) |
| Example 1 | Reference | 0 | Reference | −0.2 | Reference | 0 |
| Example 2 | −0.8 | 0 | 0.5 | 0.2 | 0.3 | 0 |
| Example 3 | 1.2 | 0 | −0.2 | 0 | −0.2 | 0 |
| Example 4 | −0.6 | −0.3 | 0 | 0.1 | 0.1 | −0.5 |
| Example 5 | 0.9 | −0.2 | 0.5 | −0.3 | 0.3 | 0.4 |
| Example 6 | 1.0 | −0.3 | 0.8 | 0.2 | −0.1 | 0 |
| Example 7 | 1.2 | −0.5 | 0.2 | 0 | −0.3 | 0.2 |
| Example 8 | 1.9 | 0 | −0.6 | −1.0 | −1 | 0 |
| Example 9 | −1.0 | 0 | −0.2 | 0 | 1 | 0 |
| Example 10 | −0.9 | −0.6 | −1.5 | 0.1 | −0.3 | −0.1 |
| Comparative Example 1 | 1.0 | −3.2 | 0.3 | −4.5 | 0 | −2.5 |
| Comparative Example 2 | −4.5 | −4.2 | −3.5 | 0.4 | −0.3 | −1.3 |
| Reference Example 1 | −1.9 | 0 | −0.3 | 0 | 0.7 | 0 |
| Reference Example 2 | 2.1 | 0 | −5.2 | −0.2 | −1.7 | 0 |
| Reference Example 3 | −2.5 | 0 | −2.0 | −0.3 | 1.8 | 0 |
| Criterion | ≧−1.5 dB | Within ±1 dB | ≧−2.0 dB | — | — | Within ±1 dB |

Table 1 indicates that the magnetic tapes of Examples 1 to 10 exhibit Hcmin angle (denoted by θ(Hcmin)) within ±30°, which is the applied magnetic field angle when coercive force is minimized, and the dipulse ratios in the forward running direction and the backward running direction are 0.36 or more, thereby decreasing a difference between the outputs in reproduction by forward running and backward running when the recording wavelength is 0.3 μm. Therefore, the difference falls within ±1 dB (Table 2). Although Japanese Unexamined Patent Application Publication No. 2004-326888 discloses that linear-system recording and reproduction may be put into practical use even by an deposited tape including a single magnetic layer, the linear-system recording and reproduction is only in a practicable level, and the deposited tape is used by correcting, with a drive, characteristics which vary with the tape. On the assumption that correction with a drive is not performed as in the present invention, a difference between the characteristics in both the forward and backward directions is preferably 1 dB or less.

On the other hand, the magnetic tapes of Comparative Examples 1 and 2 exhibit strong magnetic anisotropy, θ(Hcmin) out of the range of ±30°, and a dipulse ratio of less than 0.36 (Table 1). Since a difference between the outputs in the forward and backward directions is increased, characteristics suitable for a linear-system recording medium may not be obtained.

The magnetic tapes of Reference Examples 1 to 3 exhibit small Mr·t and thus produce small output, and [difference in output relative to Example 1 for a signal recorded at recording wavelength of 0.3 μm], which is a criterion for output for stable applicability, is −1.5 dB or less relative to the reference value (Table 2). This is a level at which actual application is difficult. On the other hand, the magnetic tape of Comparative Example 2 exhibits a target value (3 to 12 mA) of Mr·t, but the characteristics as a magnetic material are not exhibited because of the small amount of oxygen introduced near the surface of the magnetic layer or no oxygen introduced. Therefore, the maximum coercive force Hcmax is only about 62 kA/m (Table 1), and sufficient CN ratio or output are not obtained (Table 2). From the viewpoint of achieving sufficient output, the maximum coercive force Hcmax is preferably 85 kA/m or more.

Further, Examples 1 to 10 indicate that when Mr·t is 3 mA to 12 mA, the output/noise ratio (CN ratio) is (reference value −1.5) dB or more in terms of [difference in CN ratio relative to Example 1 for a signal recorded at recording wavelength of 0.3 μm], and characteristics sufficient for used as a magnetic recording and reproduction are achieved. On the other hand, Reference Example 2 indicates that when Mr·t exceeds 12 mA, the CN ratio is −5 dB or less and is degraded, thereby exhibiting impracticability (Table 2). Therefore, in order to secure a sufficient CN ratio, the maximum coercive force Hcmax is preferably 85 kA/m or more from the viewpoint of output, but is preferably 93 kA/m or more and more preferably 102 kA/m or more from the viewpoint of the CN ratio.

As described above, with the magnetic recording medium (magnetic tape) according to an embodiment of the present invention, if the magnetic recording medium includes a vertical magnetic layer with a dipulse ratio of 0.36 or more, the characteristics by running in the forward and backward directions may be considered as substantially the same. Therefore, a metal thin film magnetic tape suitable for use in a linear serpentine system may be obtained. In this case, preferably, the coercive force Hc of the vertical magnetic layer is maximized (Hcmax) near 90° with respect to the tape surface and minimized (Hcmin) within 0±30° with respect to the tape surface.

In addition, when the product Mr·t of the residual magnetization Mr and thickness t of the vertical magnetic layer is within the range of 3 to 12 mA, recorded signals on the magnetic tape are suitable for use in a magnetoresistive head or a giant magnetoresistive head.

Therefore, a magnetic tape according to an embodiment of the present invention permits high-recording density recording and reproduction with a low-cost single-layer deposited tape in a linear-system magnetic recording/reproducing system using a high-sensitivity head such as a MR head. A magnetic recording medium according to an embodiment of the present invention is not limited to the above description, and various changes may be made within the scope of the gist of the present invention.

What is claimed is:

1. A magnetic recording medium comprising:
  a tape-shaped nonmagnetic support; and
  a vertical magnetic layer formed on a main surface of the nonmagnetic support by a vacuum thin-film forming technique, a signal being recorded on and reproduced from the vertical magnetic layer in a linear system, wherein,
  a dipulse ratio of the vertical magnetic layer is 0.36 or more, and
  the vertical magnetic layer exhibits a maximum coercive force Hcmax at an applied magnetic field angle of 83 to 105 degrees with respect to the magnetic recording medium.

2. The magnetic recording medium according to claim 1, wherein the vertical magnetic layer exhibits a minimum coercive force Hcmin at an applied magnetic field angle of −30 to 30 degrees.

3. The magnetic recording medium according to claim 1, wherein the maximum coercive force Hcmax is 93 kA/m or more.

4. The magnetic recording medium according to claim 1, wherein a product Mr·t of the remanence ratio Mr and the thickness t of the vertical magnetic layer is in the range shown by expression (1), and the signal recorded on the vertical magnetic layer is reproduced by sliding a magnetoresistive magnetic head, $$3(mA) \leq Mr \cdot t < 12(mA) \qquad (1).$$

5. A magnetic recording/reproducing system comprising:
  a linear running mechanism for running the magnetic recording medium according to any one of claims 1 to 4 in both the forward and backward directions along a longitudinal direction of the magnetic recording medium so that signal recording and reproduction are performed in the longitudinal direction; and
  a magnetic head unit.

6. The magnetic recording/reproducing system according to claim 5, wherein the magnetic head unit includes a plurality of magnetic heads arranged corresponding to a plurality of tracks which are provided by dividing the magnetic recording medium in the width direction thereof.

* * * * *